United States Patent
Plotkin et al.

(10) Patent No.: US 8,085,441 B2
(45) Date of Patent: Dec. 27, 2011

(54) METHOD AND APPARATUS FOR DETECTING BANDING USING MOIRE PATTERN

(75) Inventors: Michael Plotkin, Rehovot (IL); Haim Livne, Kfar Saba (IL); Shlomo Harush, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1195 days.

(21) Appl. No.: 11/631,572

(22) PCT Filed: Jul. 7, 2004

(86) PCT No.: PCT/IL2004/000609
§ 371 (c)(1),
(2), (4) Date: Jan. 4, 2007

(87) PCT Pub. No.: WO2006/003644
PCT Pub. Date: Jan. 12, 2006

(65) Prior Publication Data
US 2008/0030790 A1 Feb. 7, 2008

(51) Int. Cl.
*G06T 5/00* (2006.01)
*H04N 1/407* (2006.01)
*H04N 1/409* (2006.01)

(52) U.S. Cl. .............. 358/3.26; 358/3.21; 358/3.24; 358/406

(58) Field of Classification Search .......... 358/1.1, 358/1.9, 3.01, 3.06, 3.21, 3.24, 3.26, 406, 358/504
See application file for complete search history.

(56) References Cited

U.S. PATENT DOCUMENTS

| | | | |
|---|---|---|---|
| 2002/0036783 A1* | 3/2002 | Yoshidome | 358/1.9 |
| 2003/0030271 A1* | 2/2003 | Wicker | 283/113 |
| 2005/0275855 A1* | 12/2005 | Mizes et al. | 358/1.9 |

OTHER PUBLICATIONS

Beyer et al, "Method of testing line-grating 'for use in moire-fringe metrology!", Jenaer Jahrbuch Germany, 1963, pp. 67-75.
"Andrew Glassner's notebook", Glassner, A., IEEE Computer Graphics and Applications, vol. 24, No. 1, Jan. 2004, pp. 86-91.
"Measuring the line spacing and density of high-resolution images from capstan and drum output scanners", Macdonald, R., Proc. SPIE, Color Hard Copy and Graphic Arts IV, Jan Bares, vol. 2413, Apr. 1995, pp. 284-292.
"Einsatz Der Moire-Technik Zur Fehlererkennung An Textilen Fiaechengebilden", Wefers et al. Textil Praxis International, Konradin Verlag R. Kohlhammer GMBH, LeinFelden, DE, 1992, pp. 834-840.
PCT International Search Report mailed May 4, 2005, from counterpart PCT Application No. PCT/IL2004/000609.

* cited by examiner

*Primary Examiner* — James A Thompson

(57) ABSTRACT

A method of determining presence of variations in interline spacing in a first image comprising a first plurality of parallel lines of pixels comprising: providing a second image comprising a second plurality of parallel lines; orienting the images so that the lines in the first and second pluralities are superimposed and angled with respect to each other to generate an interference image comprising a Moiré interference pattern; and using the Moiré interference pattern to determine presence of said variations.

17 Claims, 12 Drawing Sheets

METHOD AND APPARATUS FOR DETECTING BANDING USING MOIRE PATTERN

RELATED APPLICATIONS

This patent application claims priority to International (PCT) Application No. PCT/IL2004/000609, having International Publication No. WO 2006/003644, titled "Method and Apparatus for Detecting Banding", filed on Jul. 7, 2004, commonly assigned herewith, and hereby incorporated by reference.

FIELD OF THE INVENTION

The invention relates to detection of banding in images printed by digital printers and in quantifying characteristics of detected banding.

BACKGROUND OF THE INVENTION

To print an image on a substrate, a typical digital printer first forms an electrostatic copy of the image, conventionally referred to as a "latent image", on a photosensitive surface, for example on a cylindrical roller, hereinafter referred to as a "photosensitive imaging cylinder" (PIC). First a charger deposits a substantially uniform charge density on the photosensitive surface. The latent image is then formed by discharging regions of the charged photosensitive surface to generate a pattern of charged and uncharged pixels on the photosensitive surface that replicates the image. A developer applies ink or toner of desired color to the charged or uncharged regions using an electrostatographic process.

The toner on the PIC is then transferred from the PIC to a final substrate, optionally via an "intermediate transfer member" (ITM) to print the image. In single color printing, such as in black and white printing, the latent image is a copy (or inverse) of the image to be printed. In printing a multicolor image, such as in CMYK printing, the latent image is a copy (or inverse) of a color separation of a plurality of color separations required to print the image in color. A different color toner is transferred to the substrate for each of the plurality of color separations to print the image.

Discharging regions of the PIC's photosensitive surface to generate the latent image is generally accomplished by illuminating the regions with a beam (or multiple beams) of light from a laser that is focused to a point on the photosensitive surface. The beam is controlled so that its focal point repeatedly scans the photosensitive surface along a line parallel to the axis of the PIC as it rotates rapidly about the axis. As the beam scans a line of the photosensitive surface, it is turned on to illuminate regions of the surface along the scan line that are to be discharged and turned off so as to not illuminate regions along the scan line that are not to be discharged. The latent image is built up line by line on the photosensitive surface as the PIC turns.

To provide a latent image having accurately controlled pixel densities and consequently a printed image for which hue saturation and brightness of printed regions are accurately controlled, rotation speed of the PIC and time intervals between line scans during scanning should be substantially constant. If the rotation speed of the PIC changes, or the time interval between the onset of scans by the laser changes, spacing between scan lines will vary. As a result, the latent image will evidence bands of pixels that are parallel to the scan direction for which the pixel densities will be greater than or less than desired. When toner is applied to the PIC, the bands having greater pixel density will acquire too much toner while bands having lesser pixel density will acquire too little toner. An image printed on a substrate from the latent image will, as a result, have bands of too little or too much toner, i.e. bands of unwanted variations in optical density, that are perpendicular to the process direction of the image and quality of the printed image will be compromised. (The process direction is a direction along which the image moves during image formation or transfer.)

The term "banding" is generally used to refer to bands of undesired variations in the optical density of an image. For the situation described above, these variations are substantially perpendicular to the process direction and parallel to the scan direction. Banding or other undesired variations of density in an image along the scan direction, i.e. perpendicular to the process direction, may also occur, due to variations in scanning speed. It is relatively difficult to control all the variables that can cause banding in an image printed by digital printers and digital printer images may exhibit banding of varying degrees of severity in one or both directions.

SUMMARY OF THE INVENTION

An aspect of some embodiments of the present invention relates to providing a method of detecting banding in images printed by a digital printer.

An aspect of some embodiments of the invention relates to providing a method of quantifying severity and/or other characteristics of banding in the images.

In accordance with an embodiment of the invention, a reference image comprising a pattern of parallel lines is generated. Optionally, any two adjacent lines in the pattern are equally spaced. In some embodiments of the invention, the reference image comprises identical groups of equally spaced lines, wherein any two adjacent groups of lines are equally spaced. A copy of an image, hereinafter a "test image", comprising a pattern of parallel lines optionally substantially identical to that in the reference image is printed by the digital printer with the lines substantially perpendicular to the process direction.

The reference image and the printed copy of the test image are superposed with their lines angled with respect to each other to generate an image, hereinafter an "interference image". The interference image comprises a Moiré interference pattern generated by interference between the reference image and the copy of the test image. If there is substantially no banding in the "copy image", the interference image exhibits an interference pattern of relatively straight Moiré interference bands. If on the other hand, banding flaws the copy image, the interference image will exhibit irregularities that perturb the straight interference bands and morph them into, generally, "zigzag" interference bands.

In accordance with an embodiment of the invention, the irregularities are used as indicators of the presence and severity of banding in images printed by the printer.

In accordance with an embodiment of the invention, the irregularities are used to quantify characteristics of the banding.

Optionally, the irregularities are used to determine a spatial period of the banding. Optionally, the irregularities are used to determine variations in spacing between the pixel lines in the image that give rise to the banding.

In some embodiments of the invention, the reference image is a carefully prepared transparency. The copy of the test image is printed by the printer and the reference image transparency is superposed on the copy image to form the interference pattern.

In some embodiments of the invention the reference image is an image preprinted on a substrate and the interference image is generated by printing a copy of the test image on the substrate over the reference image.

In some embodiments of the invention, a "test" PIC having an accurately configured permanent latent image of the reference image formed on its photosensitive surface is installed in the printer and the printer prints the reference image on a substrate using the test PIC. Optionally, a latent image of the test image is generated on the test PIC to superpose the latent test image with the latent reference image on the PIC photosensitive surface. The lines of the latent reference image and the latent test image are angled with respect to each other so that the superposed latent images generate a latent interference image exhibiting a Moiré pattern. The interference image is printed from the latent interference image.

Whereas to test for banding along the process direction (i.e. bands that are substantially perpendicular to the process direction and substantially parallel to the scan direction), lines in a test image and a reference image are substantially perpendicular to the process direction, in some embodiments of the invention, reference and test images are used to test for bands of undesired variations in directions other than the process direction. For example, to test for variations along the scan direction, i.e. scanning "non-linearity", a reference image and test image having lines substantially perpendicular to the scan direction and parallel to the process direction are used.

In accordance with some embodiments of the invention a reference image comprises a grid formed from a first set of parallel lines crossed by a second set of parallel lines. Optionally, the lines in the first and second sets of parallel lines are substantially perpendicular to each other. Optionally, the lines in the first set of parallel lines are substantially parallel to the scan direction. Such a grid reference image and a corresponding grid test image may be used to simultaneously detect undesired "banding" or other variations along the process direction and scan directions (scanning "non-linearity). However, interference images generated by superimposing a grid reference image and a copy of a grid test image are generally more complicated and difficult to interpret than interference images generated by a simpler "one dimensional" reference image and corresponding copy of a test image.

There is thus provided, in accordance with an embodiment of the invention, a method of determining presence of variations in interline spacing in a first image comprising a first plurality of parallel lines of pixels comprising:

providing a second image comprising a second plurality of parallel lines;

orienting the images so that the lines in the first and second pluralities are superimposed and angled with respect to each other to generate an interference image comprising a Moiré interference pattern; and using the Moiré interference pattern to determine presence of said variations.

In an embodiment of the invention the variation is characterized by at least one group of lines having a plurality of consecutive lines for which interline spacing is different from interline spacing of lines outside the at least one group. Optionally, the interline spacing between lines in the at least one group is substantially the same for any pair of adjacent lines in the at least one group. Optionally, the interline spacing for lines outside the at least one group is substantially the same for any pair of adjacent lines outside the at least one group.

Optionally, the at least one group comprises a plurality of groups, optionally, periodic groups.

Optionally, the method includes using the interference pattern to determine a period for the groups of lines.

Optionally, the method includes using the interference pattern to determine an amount by which interline spacing of lines in the group differs from interline spacing between lines outside of the at least one group.

Optionally, the Moiré pattern comprises a pattern of interleaved relatively light and relatively dark interference bands. In an embodiment of the invention, interference bands comprise relatively straight segments that are angled with respect to each other and using the interference pattern to determine a difference in interline spacing comprises determining an angle between the segments of an interference band. Optionally, using the angle between the segments comprises determining a ratio R of the interline spacing between lines in the at least one group of lines relative to lines outside of the at least one group in accordance with an expression of the form $R=\cos(\theta+\alpha/2)/\cos(\theta-\alpha/2)$, where $\theta$ is the determined angle between segments and $\alpha$ is the angle between lines in the first and second images.

In an embodiment of the invention, the light and dark interference bands cross the lines in the first and second images, wherein a location in the Moiré pattern is defined relative to an x-axis and a y-axis respectively parallel and perpendicular to the lines in the first image and each interference band defines a contour line that lies along a central spine of the interference band and a direction line that lies along a general direction of the contour line, and comprising estimating the interline spacing of lines in the first image at a given y-coordinate in accordance with a formula, $(s^2/L)(d\Delta x/dy)$, where s is an interline spacing in the second image, L is a distance between adjacent bright or adjacent dark interference bands at the given y-coordinate and $\Delta x$ is a distance between the contour line and direction line at the given y-coordinate.

Optionally, the first images comprises a third plurality of parallel lines that cross lines in the first plurality of parallel lines.

Optionally, the lines in the second image comprise a fourth plurality of lines that cross the second plurality of lines. Optionally, orienting the images comprises orienting so that an angle between the lines in the first and second pluralities is substantially smaller than an angle between the lines in the first and fourth pluralities.

In an embodiment of the invention, the lines in the first and third pluralities of parallel lines are substantially perpendicular. Optionally, the lines in the second and fourth pluralities are substantially perpendicular.

In an embodiment of the invention, the method includes using the interference pattern to determine presence of variations in interline spacing between lines in the third plurality of lines.

In an embodiment of the invention, the first image is printed on a first substrate by a printer having a process direction. Optionally, the lines in the first plurality of lines in the first image are substantially perpendicular to the process direction. Optionally, the second image is printed by the printer on a second substrate. Optionally, the first and second substrates are overlaid to generate the interference image. Optionally, the second image is printed by the printer on the first substrate. Optionally, the second image is printed simultaneously with the first image.

In an embodiment of the invention, when the printer is a digital printer comprising a laser and a photosensitive imaging cylinder (PIC) having a photosensitive surface and wherein the laser scans the photosensitive surface along a scan direction to generate a latent image of an image that is printed by the printer. Optionally, the scan direction is substantially perpendicular to the process direction. Optionally, a permanent latent image of the second image is formed on the photosensitive surface.

BRIEF DESCRIPTION OF FIGURES

Non-limiting examples of embodiments of the present invention are described below with reference to figures attached hereto, which are listed following this paragraph. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION OF EXEMPLARY EMBODIMENTS

Figure 1A:
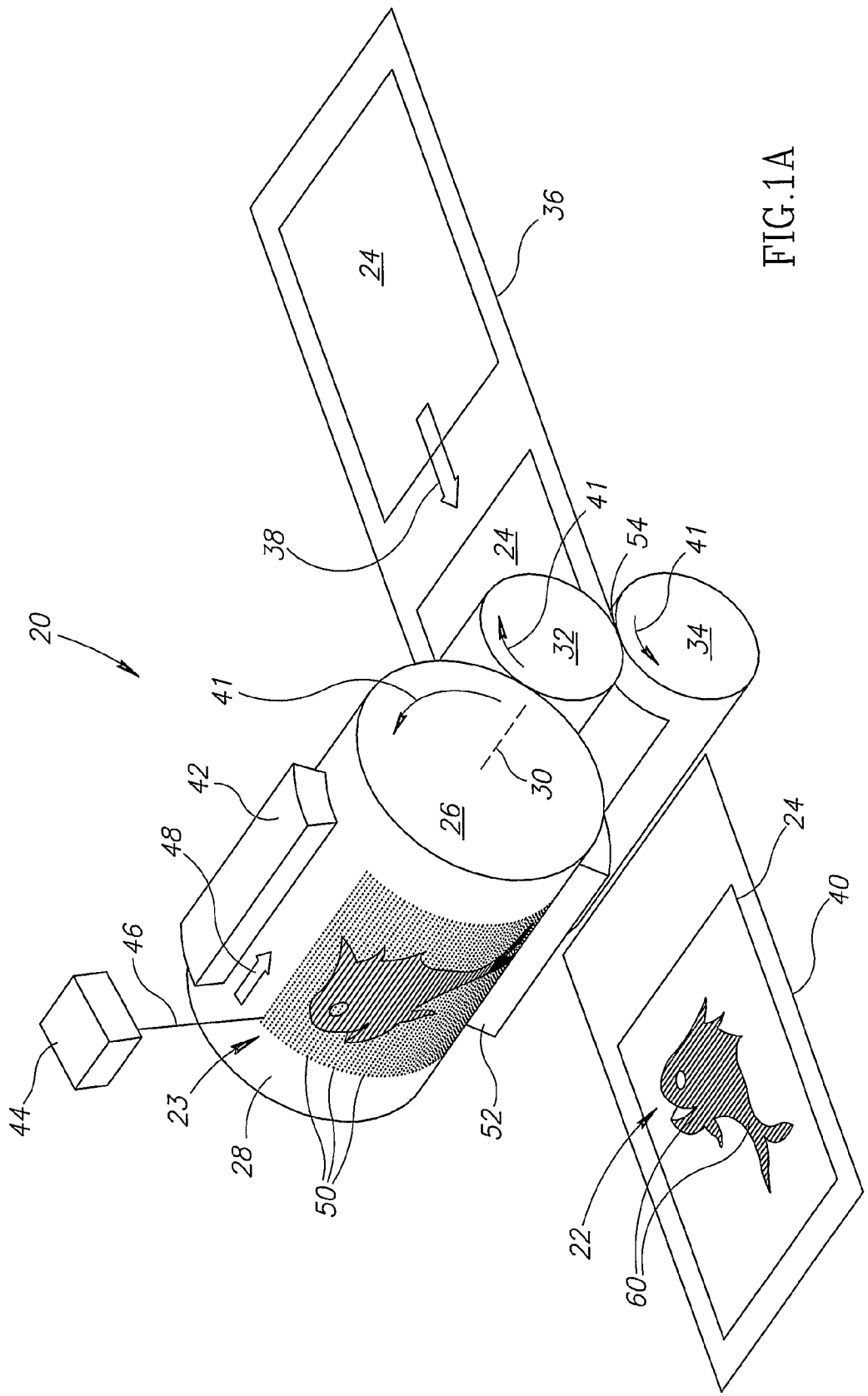
FIG. 1A schematically shows a digital printing press printing an image substantially free of banding.

FIG. 1A shows a schematic digital printer 20 that prints images substantially free of banding. Printer 20 is shown printing an image 22 on substrates, for example on sheets 24 of paper. For simplicity of presentation, image 22 is assumed to be a monotone solid color image printed in one color and having a constant brightness. In FIG. 1A image 22, is shown formed by solid lines 60 that represent lines of closely spaced printed pixels of the color. Spacing between lines 60, as noted below, is greatly exaggerated for convenience of presentation and would not normally be seen by the naked eye.

Printer 20 optionally comprises a photosensitive imaging cylinder (PIC) 26 having a photosensitive surface 28 and axis 30, an intermediate transfer member (ITM) 32 and an impression roller 34. A conveyor 36 feeds unprinted sheets 24 to printer 20 in a process direction indicated by block arrow 38 and sheets printed by the printer are optionally collected at an output tray or station 40 or alternatively first printed on the opposite side of the sheet and then collected at the output tray or position. Arrows 41 indicate directions in which PIC, ITM and impression roller 34 rotate during printing of image 22. Only elements and features of digital printer 20 that are germane to the discussion are shown in FIG. 1A.

In the printing process, as PIC rotates, a charger 42 charges photosensitive surface 28 so that it has a substantially uniform surface charge density. A laser unit 44 comprising a laser and associated optics focuses a laser beam 46 (or a plurality of laser beams) onto photosensitive surface 28 and directs the laser beam to repeatedly scan the charged photosensitive surface along a line (or a plurality of parallel lines) substantially parallel to axis 30 of the PIC. The scan direction of laser beam 46 is indicated by a block arrow 48. During a scan of photosensitive surface 28, as laser beam 46 moves along the scan line, laser unit 44 turns on laser beam 46 at pixels along the scan line that are to be discharged and turns off the laser beam at pixels along the scan line that are to remain charged. Thus while the image is shown as being made up of lines 60 for clarity of presentation, the image is actually made up of lines of pixels.

As result of the rotation of PIC 26 and the scanning motion of laser beam 46, a plurality of lines 50 are sequentially scanned on photosensitive surface 28 and pixels along each of the lines are selectively discharged or left charged as required to generate a latent image 23 of image 22 on photosensitive surface 28. Regions of a scanned line 50 in latent image 23 comprising discharged pixels are represented by dashed segments of the line. It is noted that while latent image 23 is shown as being visible, it is actually an invisible "image" of charges.

Regions of a scanned line 50 comprising pixels that are left charged are represented by solid segments of the line. PIC 26 rotates with a substantially constant speed of rotation such that for substantially all pairs of adjacent scanned lines 50 on photosensitive surface 28, the scanned lines are spaced apart a same distance. In FIG. 1A and figures that follow, spacing between scanned lines 50 is greatly exaggerated for convenience of presentation. It should be noted that while FIG. 1A shows a printer in which one line is scanned at a time, a plurality of lines may be simultaneously scanned.

A toner of suitable color is applied to latent image 23 as the latent image passes beneath a developer 52. The toner is transferred from the latent image to ITM 32 and from the ITM to a sheet of paper 24 fed to printer 20 by conveyor 36 as the sheet passes through a nip 54 between ITM 32 and impression roller 34. Because scanned lines 50 on photosensitive surface 28 are equally spaced one from the other, corresponding lines 60 of pixels in printed image 22 are also equally spaced apart. Pixel density in the printed image 22 is therefore substantially uniform and the printed image does not exhibit banding.

FIG. 1B again shows printer 20 shown in FIG. 1A printing image 22. However, in FIG. 1B as a result, for example of wear in bearings (not shown) that support PIC 26 or of vibration in printer 20, PIC 26 exhibits a variation in its rotation speed and the printer no longer prints band free images. As a result of the variation in rotation speed, scanned lines 50 on photosensitive surface 28 are no longer equally spaced one from the other and printed image 22 exhibits bands of undesired shading. By way of example, in FIG. 1B the variation in rotation speed of PIC 26 is assumed to be an intermittent, recurring increase in the rotation speed. As a result, spacing between scanned lines 50 in latent image 23 is no longer uniform but periodically increases. Printed image 22 therefore exhibits bands 61 of pixel lines 60 for which interline spacing is increased and pixel and color density therefore decreased.

Figure 1B:
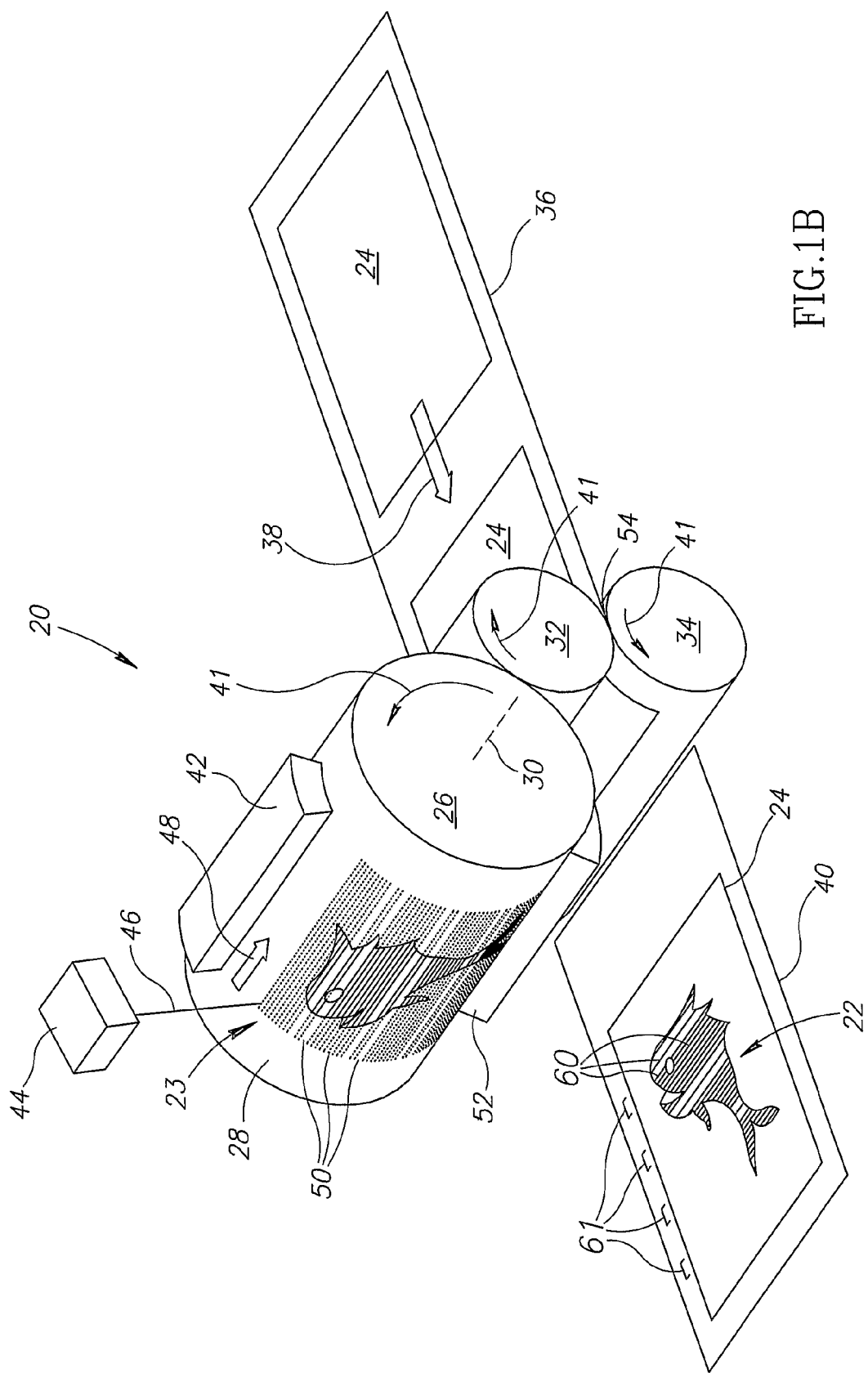
FIG. 1B shows the printing press shown in FIG. 1A printing an image flawed by banding.

In FIG. 1B, variation in spacing of scanned lines 50 and consequent banding in printed image 22 are greatly exaggerated for clarity of presentation and is indicated by a recurrent absence of a scan line 50 and a corresponding image line 60. In general, variation in spacing of scanned lines 50 is much more moderate and banding is much subtler. However, even subtle banding can affect perceived quality of a printed image and reduce the perceived quality of a high quality printed image.

In accordance with an embodiment of the invention, to detect and optionally quantify characteristics of banding in an image printed by a printer, a copy of a test image printed by the printer is superposed with a reference image to generate an interference image exhibiting a Moiré interference pattern. The reference image comprises a plurality of optionally equally spaced parallel lines. The test image also comprises a plurality of parallel lines. Optionally, the parallel lines in the test image are equally spaced one from the other by a same interline spacing that separates the parallel lines of the reference image. The reference image and the copy of the test image are superposed with the lines in the images angled with respect to each other at an angle, hereinafter a "Moiré angle", to generate the Moiré interference pattern. Features of the interference image Moiré pattern are used to determine the presence of banding and optionally to quantify characteristics of the banding.

In some embodiments of the invention, the reference image is provided on a transparent sheet which is overlaid on the copy of the test image to form the interference pattern.

In some embodiments of the invention, the reference image is a printed image on a sheet and a copy of the test image is overprinted on the reference image.

In some embodiments of the invention, the reference image is provided using a test PIC having an accurately configured "latent" reference image permanently formed on its photosurface. The PIC is mounted to the printer and a latent image of the test image is generated over the preformed latent reference image on the test PIC to superpose the latent images and form a latent image of interference image on the PIC. The interference image is printed from its latent image. The latent image on the photoreceptor can be generated for example, by burning the pattern that characterizes the reference image on the photoreceptor using a laser beam of appropriate energy.

Figure 2:
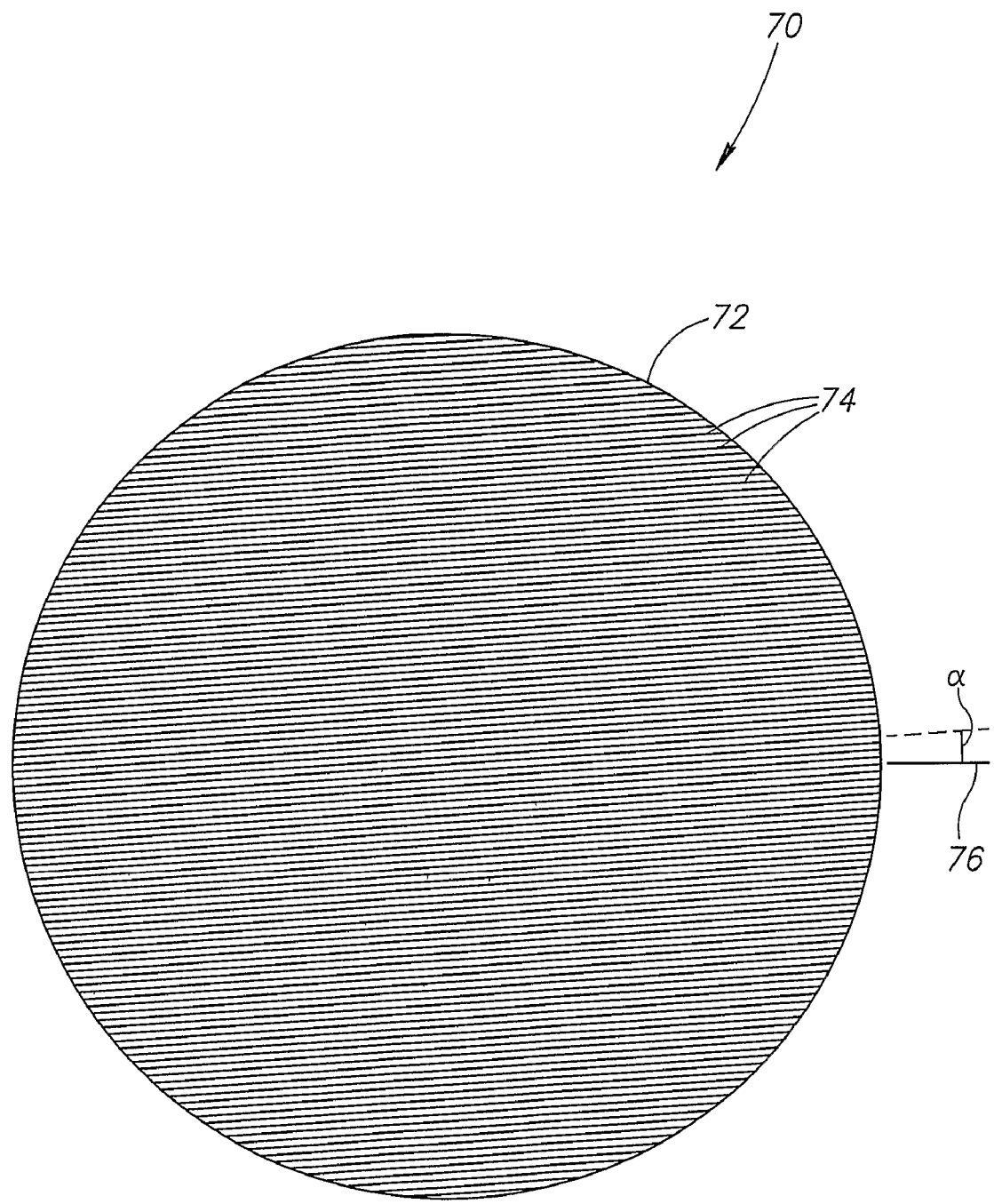
FIG. 2 shows a schematic reference image, in accordance with an embodiment of the present invention.

FIG. 2 shows a schematic reference image 70 used to detect and optionally quantify characteristics of banding in images printed by a printer, in accordance with an embodiment of the invention. By way of example, reference image 70 comprises a plurality of lines 74 that are equally spaced from each other and optionally angled with respect to the horizontal, indicated by a horizontal line 76 (the horizontal is perpendicular to the process direction), by a Moiré angle, $\alpha=3.5°$. For convenience of presentation reference image 70 is shown circumscribed by a circle 72. (A reference image in accordance with an embodiment of the present invention is of course not limited to any particular shape perimeter.)

Figure 3:
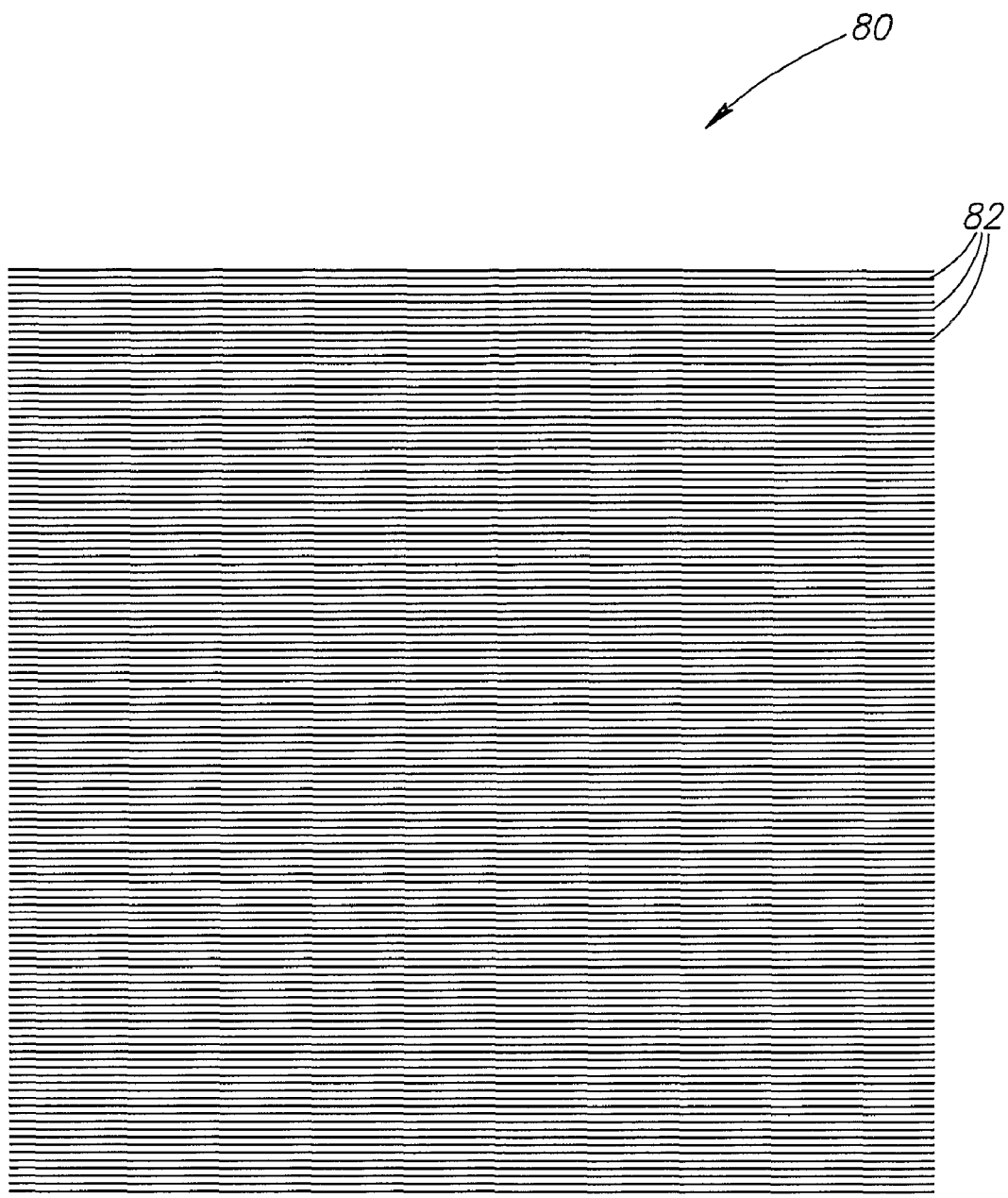
FIG. 3 shows a schematic test image, in accordance with an embodiment of the invention.

FIG. 3 shows a schematic test image 80 that is printed by a printer to test if the printer generates banding in images that it prints, in accordance with an embodiment of the invention. Test image 80 comprises a plurality of parallel, optionally horizontal lines 82. Optionally lines 82 in test image 80 are equally spaced. In some embodiments of the invention, spacing between lines 82 in test image 80 is the same as that of lines 74 in reference image 70. In some embodiments of the invention lines 82 are configured in a pattern identical to that of lines 74 in reference image 70. In some embodiments of the invention, spacing between lines in the test image is different from that in the reference image.

By way of example, lines 82 in test image 80 are of equal length, cover a rectangular area and have a line spacing pattern identical to that of reference image 70. If the printer that prints a copy of test image 80 does not generate banding, spacing between lines in the printed copy will not vary and will be substantially equal to that of the original test image. The printed copy of test image 80 will be a "true copy" of, and substantially identical to, the test image. An interference image generated from the superposition of reference image 70 and the printed true copy of test image 80 will exhibit an interference Moiré pattern characterized by parallel straight alternating bright and dark "interference bands".

Figure 4:
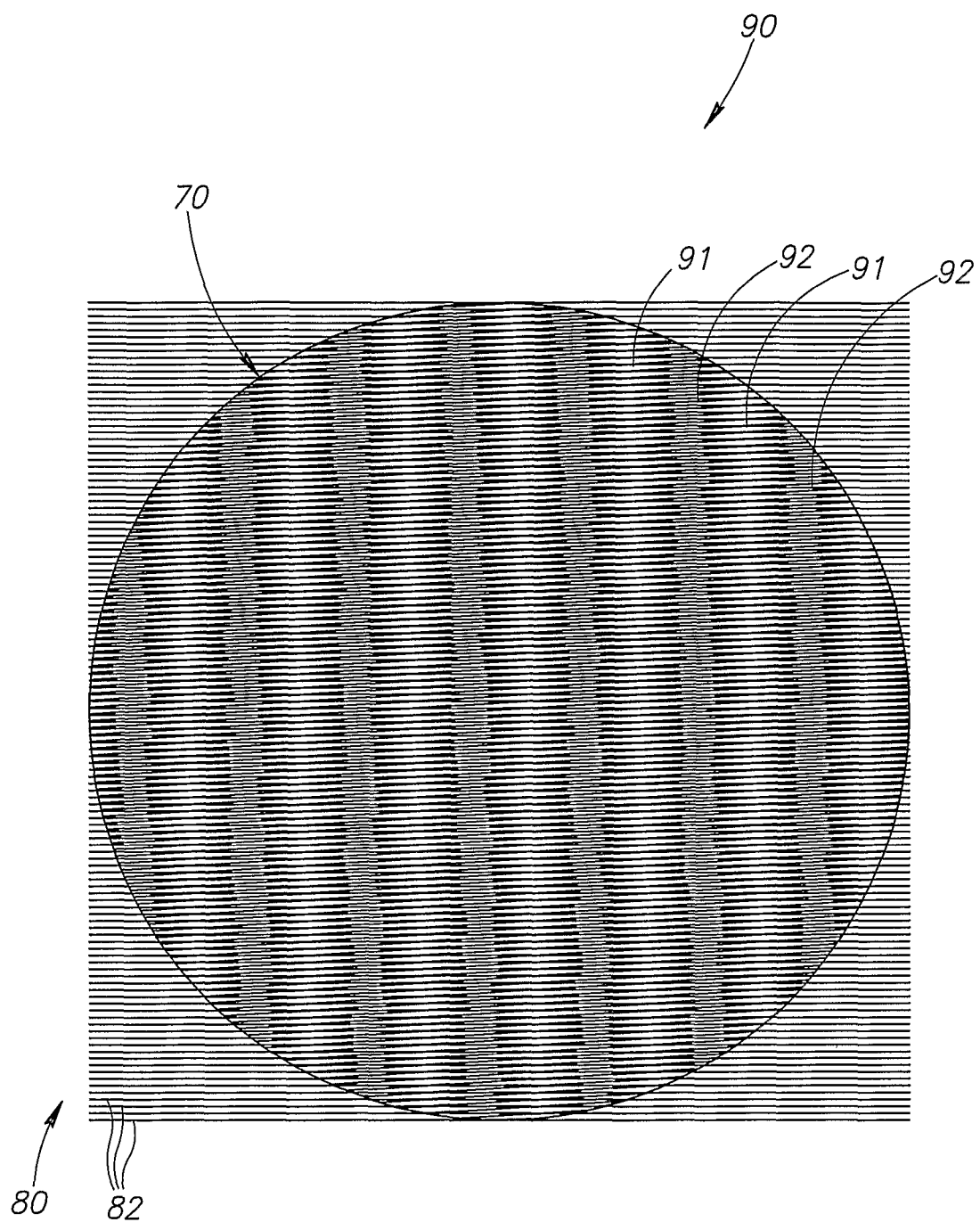
FIG. 4 shows an interference image generated between the reference image shown in FIG. 2 and a "true" copy of the test image shown in FIG. 3 that does not have banding for testing for the presence of banding in the copy image, in accordance with an embodiment of the invention.

FIG. 4 shows an interference image 90 generated by superposing reference image 70 and a true copy of test image 80. The interference image shows a regular pattern of straight bright and dark interference bands 91 and 92 respectively. The direction of an interference band 91 or 92 is tilted slightly from the vertical by an angle equal to half the Moiré angle $\alpha$. (In FIGS. 3 and 4 lines 82 of the copy of test image 80 are assumed to be horizontal, and the vertical is a direction perpendicular to lines 82.)

Figure 5:
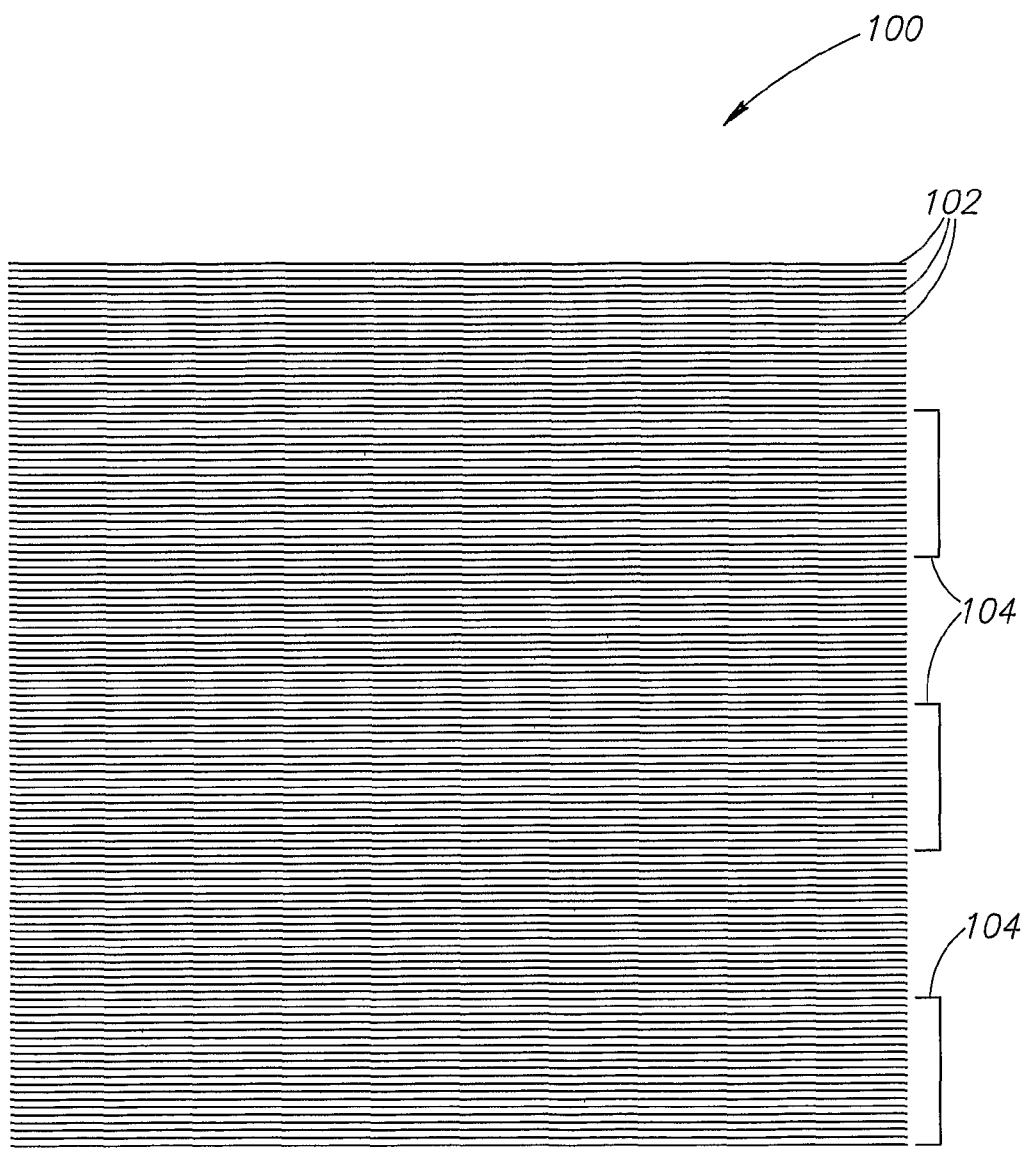
FIG. 5 shows a copy of the test image shown in FIG. 3, which is flawed by banding.

FIG. 5 shows a possible, "hypothetical", example of a copy 100 of test image 80 printed by a printer that generates banding in images that it prints. Copy test image 100 appears identical to test image 80 and comprises a plurality of parallel lines 102 that appear equally spaced. However, copy 100 is flawed by banding and the copy comprises spatially periodic bands of 20 consecutive lines 102 for which spacing between the lines is about 3% greater than spacing between lines 102 in test image 80. The bands of lines 102 having increased interline spacing are indicated by brackets 104. Whereas the banding is substantially non-discernable in copy image 100, such banding may reduce the perceived quality of an image printed by a printer compromised by the banding.

An increased interline spacing, such as that exhibited by copy image 100, is generally caused by a periodic increase in the rotation speed of PIC 26 and/or a periodic decrease in the frequency with which laser beam 46 scans the PIC. For example, the 3% increase in interline spacing for lines 102 in brackets 104 may be caused by a 3% increase in rotation speed of PIC 26 or a 3% decrease in scan frequency of laser beam 46. Alternatively, the increase in interline spacing may be caused by a combination of a change in, rotation speed and scan frequency. For example, a 2% increase in rotation speed and a 1% decrease in scan frequency will result in a 3% increase in interline spacing.

Figure 6:
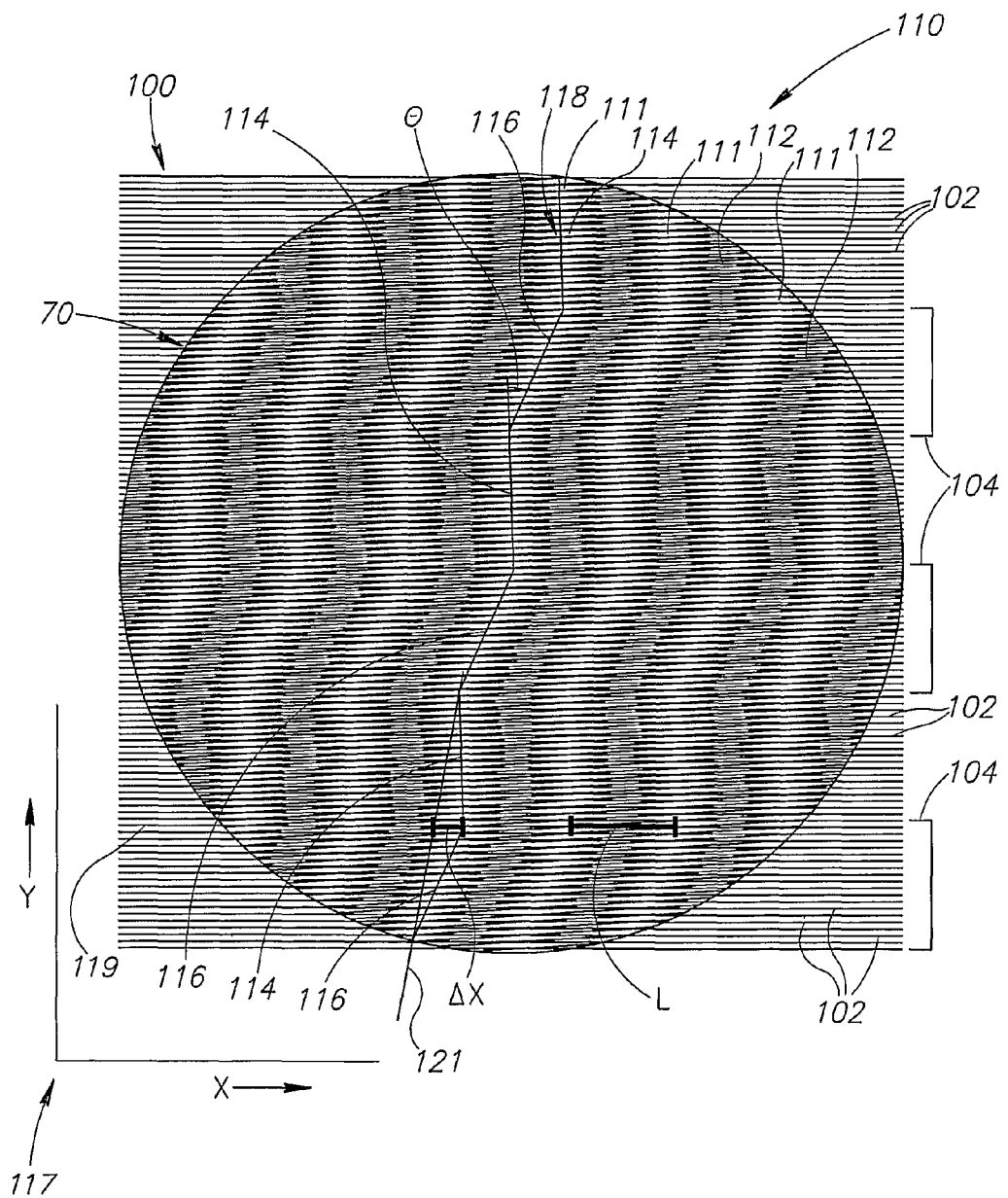
FIG. 6 shows an interference image generated between the reference image shown in FIG. 2 and the copy test image shown in FIG. 5 for testing for the presence of banding in the copy image, in accordance with an embodiment of the invention.

FIG. 6 shows an interference image 110 generated by the superposition of reference image 70 and copy image 100 shown in FIG. 5. Whereas the presence of banding in copy 100 is substantially undetectable by the naked eye, the presence of banding in the copy is readily evidenced by the effects of the banding in interference image 110. The banding has substantially altered the straight bright and dark interference bands in interference image 90 (FIG. 4) for the case for which the copy of test image 80 is free of banding. Instead of the straight interference bands in interference image 90, the interference pattern exhibited in interference image 110 comprises bright and dark zigzag interference bands 111 and 112 respectively. Each interference band 111 and 112 comprises substantially vertical straight segments 114 that have a direction that is the same as that of interference bands 91 and 92 shown in FIG. 4 (i.e. angled at $(90°+\alpha/2)$ relative to the horizontal) alternating with and connected by relatively strongly angled (relative to the vertical) straight segments 116. A contour line 118 is drawn along the central "spine" of one of bright zigzag bands 111 in interference image 110 to aid in visualizing the shape of the band and the angular relationship between its vertical and angled segments 114 and 116.

In an embodiment of the invention, features of the interference pattern in interference image 110 are used to quantify characteristics of banding in copy 100 (FIG. 5) of test image 80 (FIG. 3). For example, the width of "line-bands" 104 of "widely spaced" lines 102 in copy image 100 can be determined from the length of angled segments 116. The spatial period of line-bands 104 is equal to the spatial period along the vertical direction in interference image 110 (FIG. 6) with which angled segments 116 or vertical segments 114 repeat in a given zigzag bright interference band 111.

An angle θ between a vertical segment 114 and an angled segment 116 of a bright band 111 may be used to determine by how much spacing between widely spaced lines 102 in line-bands 104 of copy image 100 is greater than the spacing between lines 74 in reference image 70. If the spacing between lines 74 in reference image 70 is represented by "s" and spacing between widely spaced lines 102 in copy image 100 by "S" a relative size of the interline spacing, S/s, is given by an expression:

$$S/s = \cos(\theta + \alpha/2)/\cos(\theta - \alpha/2). \qquad 1)$$

In the expression for S/s, for convenience, angles are considered to be positive if "counterclockwise" and negative if "clockwise". The angle θ is considered negative in FIG. 6 since line segments 116 are rotated clockwise relative to vertical segments 114 and, by way of example, α is positive since test image 70 is rotated counterclockwise from the horizontal. The ratio S/s provides a measure of variation, in rotation speed of PIC 26 and/or scanning frequency of laser beam 46. For example, for copy image 100, the ratio S/s is equal to about 1.03 and indicates that the rotation speed of PIC 26 periodically increases by about 3%, the scan frequency periodically decreases by about 3% or that a sum of the relative changes in rotation speed and scan frequency is equal to about 3%.

In some embodiments of the invention, a displacement of a zigzag Moiré interference band, such as a bright interference band 111, from a straight line along a general direction of the interference band is used to estimate an error in interline spacing of lines that generates the zigzag interference band. The straight line is optionally a regression line determined from a contour line of the interference band or a line determined visually that connects recurrent features of the contour line.

For example, let the y-axis and x-axis respectively of a coordinate system 117 shown in FIG. 6 indicate the process direction and scan direction respectively of the printer that printed copy image 100. A location along the process direction of a particular given line 102 labeled 119 in the test image is given by its y-coordinate. A line segment 121 optionally between intersections of vertical and angled segments 114 and 116 along a same side of contour line 118 indicates an average slope of the bright interference band associated with the contour line.

Assume, that were there no banding errors in copy image 100, line 119 would have a y-coordinate equal to $y_o$, but because of banding, the actual y-coordinate of the line is displaced by Δy from $y_o$, i.e. $\Delta y = (y - y_o)$. In accordance with an embodiment of the invention, Δy is estimated from an expression $$\Delta y = (s/L)\Delta x. \qquad 2)$$

In the expression, s is the spacing noted above between lines in reference image 70, L is a distance along the scan direction between adjacent bright interference bands 111 (or dark interference bands 112), and Δx is a distance along line 119 between contour line 118 and direction line segment 121. L and Δx are indicated in FIG. 6.

If S(y) is the interline spacing between lines 102 at the y coordinate of a line 102, such as line 119, then $S(y) \cong s(1 + d\Delta y/dy) \cong s(1 + (s/L)d\Delta x/dy)$, where dΔy/dy and dΔx/dy are the first derivatives respectively of Δy and Δx with respect to y and dependence of L on y is, optionally, ignored. An error in interline spacing at coordinate y is equal to $$(S(y) - s) \cong d\Delta y/dy \cong (s/L) d\Delta x/dy).$$

It is noted that bands of unwanted changes in optical density (OD), are generated by changes in interline spacing of printed lines of pixels. Optical density as a function of y, OD(y), is proportional to 1/S(y) and an unwanted change in optical density ΔOD(y) is proportional to [1/S(y) − 1/s] so that $\Delta OD(y) \cong [(s - S(y)]/s^2 \cong (1/sL)d\Delta x/dy$.

Figure 7:
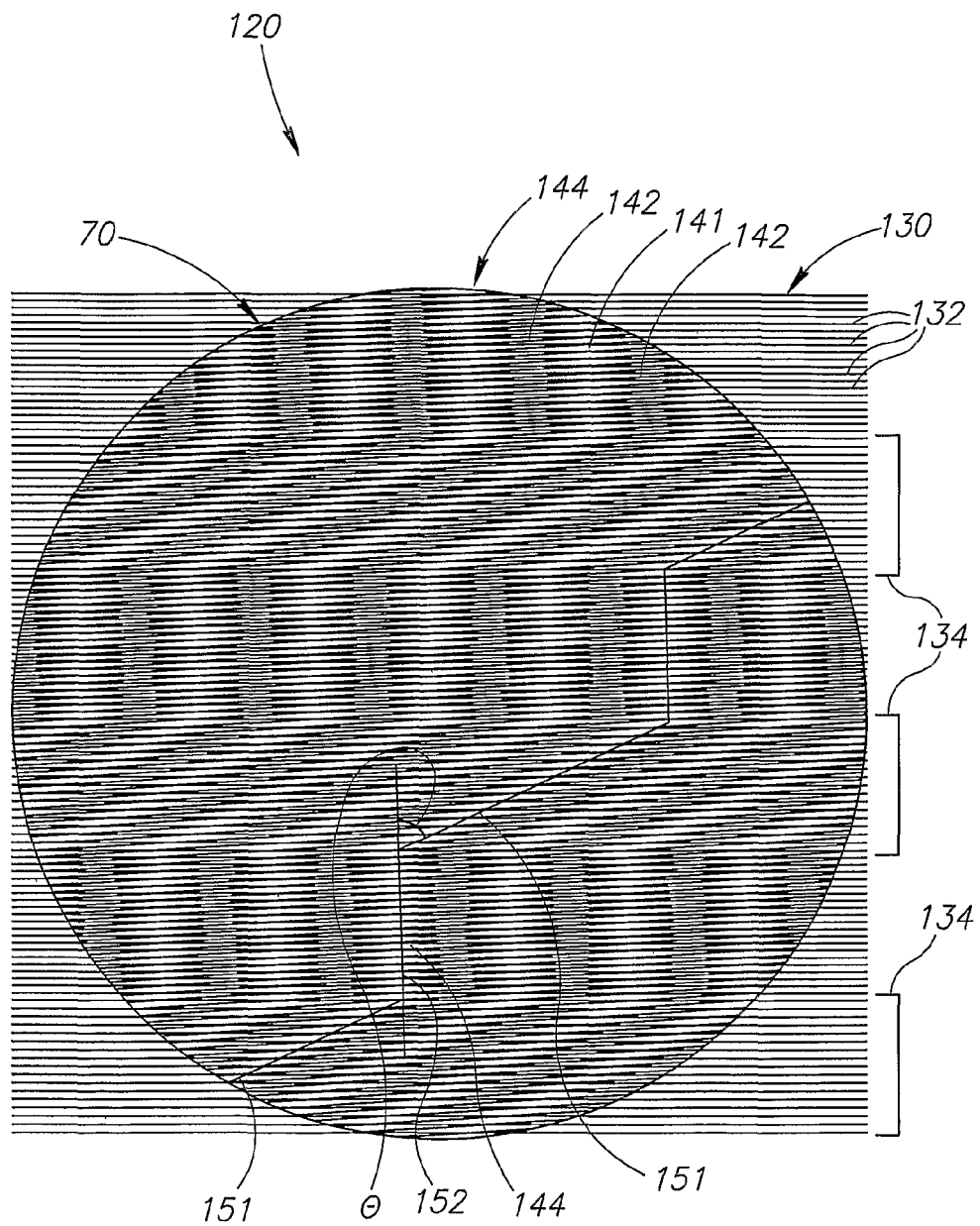
FIG. 7 shows an interference image generated between the reference image shown in FIG. 2 and a copy of the test image shown in FIG. 3, in which banding is different from that in the copy image shown in FIG. 5, in accordance with an embodiment of the invention.

FIG. 7 shows an interference image 120 between reference image 70 and a copy 130 of test image 80 (FIG. 3) characterized by banding in which lines 132 in bands indicated by brackets 134 of copy 130 have interline spacing about 15% greater than that of lines 74 in the reference image. Interference image 120 exhibits a Moiré pattern of bright and dark interference bands 141 and 142 respectively that is easily recognized as different from the Moiré pattern exhibited in interference image 110 (FIG. 6). A contour line 144 traces the spine of one of bright bands 141.

Whereas, the spatial frequency of line-bands 134 in copy image 130 is the same as that of line-bands 104 in copy image 100 (FIGS. 5 and 6), the angle θ between angled and vertical segments 151 and 152 of a bright band 141 in interference image 120 is equal to about 66.73°. From expression 1 given above, the relative interline spacing between lines 132 in line-bands 134 of copy image 22 and line spacing in reference image 70 is about 15%.

It is noted that whereas in the above examples of exemplary embodiments of the invention undesired bands of shading substantially perpendicular to the process direction are detected, a band or bands of undesired shading along substantially any direction in a printed image may be similarly detected. Bands along a given direction may be detected in accordance with an embodiment of the invention using a reference image comprising lines oriented substantially parallel to the given direction and a corresponding test image having lines angled by a Moiré angle with respect to the reference image (or by suitably rotating a transparent reference image overlay). For example, spacing variations in the scan direction cause bands parallel to the process direction, which may be detected in accordance with an embodiment of the invention using a reference image and a corresponding test image having lines substantially parallel to the process direction. Such a measurement can be used to determine variations in scan velocity of laser beam 46 and can be used to control when the laser beam is turned on and off to compensate for such variations.

In some embodiments of the invention, a reference image comprising a grid of crossed lines is used to simultaneously detect banding in more than one direction. Optionally, the crossed lines comprise a first plurality of equally spaced parallel lines perpendicular to a second plurality of equally spaced parallel lines. Optionally the first plurality of lines is tilted with respect to the horizontal (perpendicular to the process direction) by a "horizontal" Moiré angle and the second plurality of lines is tilted with respect to the vertical (parallel to the process direction) by a "vertical" Moiré angle. Optionally, the horizontal and vertical Moiré angles are equal. A reference image comprising horizontal and vertical crossed lines may be used to simultaneously detect banding along the process direction and along the scan direction.

Figure 8A:
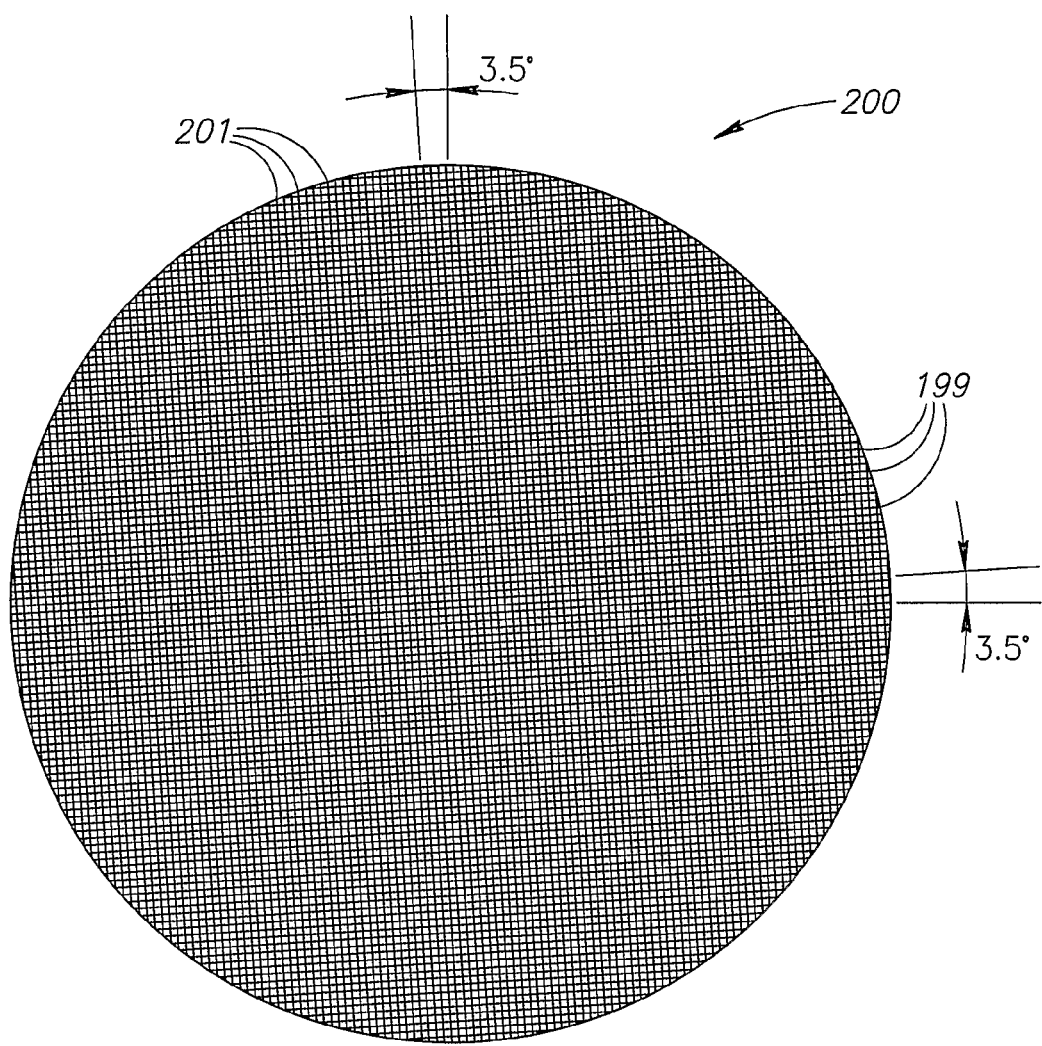
FIGS. 8A-8D show a reference image comprising a grid of lines that cross each other at right angles and interference images generated by superposing the reference image and copies of test images characterized by different degrees of banding and/or scan direction defects.

By way of example, FIG. 8A shows a reference image 200 suitable for simultaneously detecting banding in both scan and process directions. Reference image 200 optionally comprises a first plurality of parallel lines 199 tilted with respect to the horizontal by a Moiré angle equal to about 3.5° and a second plurality of lines 201 tilted with respect to the vertical by Moiré angle also equal to about 3.5°.

Figure 8B:
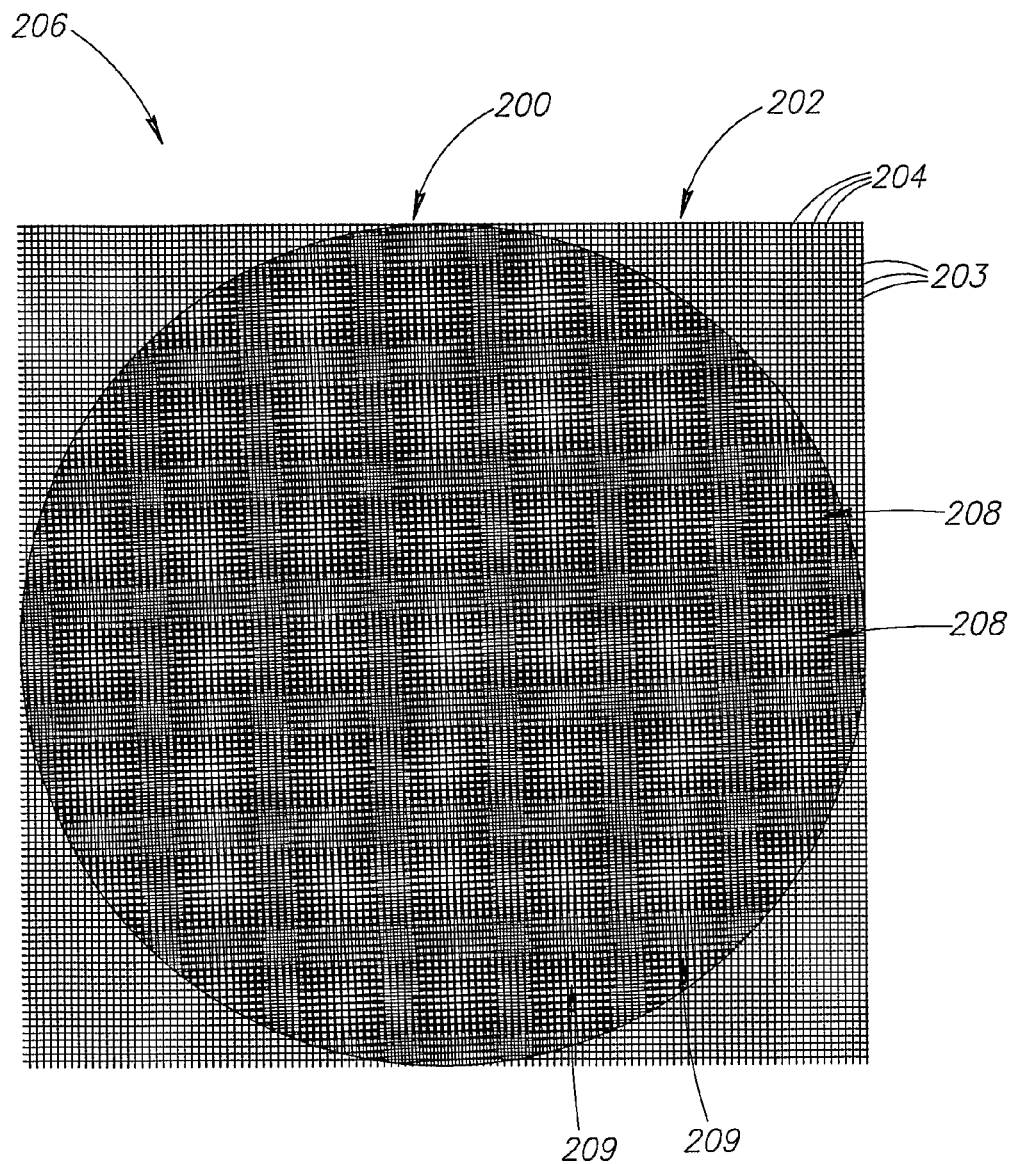

FIG. 8B shows reference image 200 superimposed with a copy 202 of a test image comprising a grid of horizontal and vertical lines 203 and 204 respectively to generate an interference image 206 in accordance with an embodiment of the invention. Copy 202 of the test image is not degraded by banding in either the process direction or the scanning direction. Interference image 206 therefore exhibits a pattern of straight horizontal and vertical bright interference bands 208 and 209 that are perpendicular to each other and form a regular pattern of relatively dark regions that appear square.

Figure 8C:
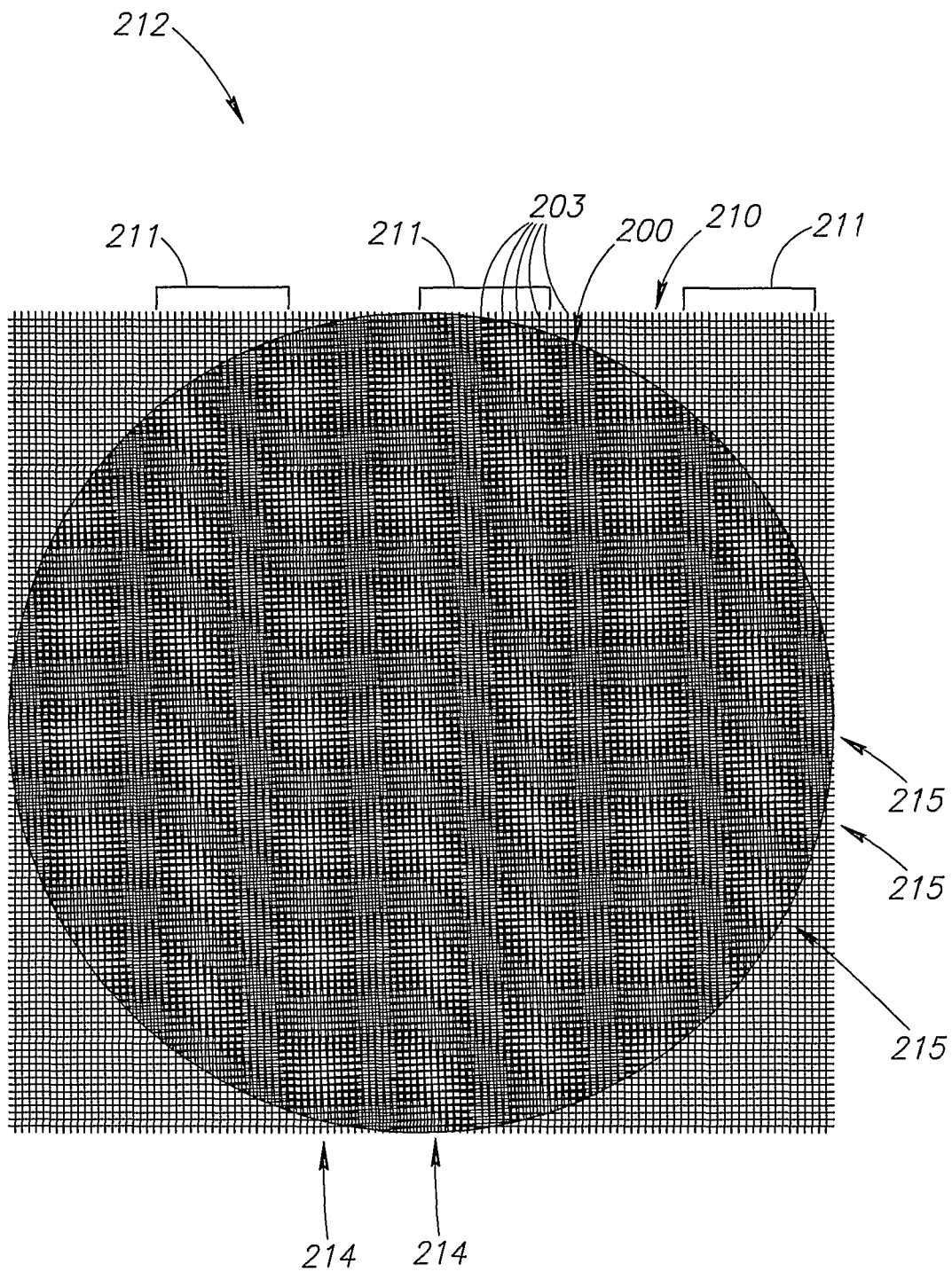

FIG. 8C shows a superposition of reference image 200 with a copy 210 of the test image that suffers from scan direction spacing variations to form an interference image 212. By way of example, the banding in copy 210 of the test image is characterized by vertical line-bands indicated by brackets 211 comprising vertical lines 203 for which the interline spacing is about 3% greater than for lines 203 outside of the line-bands. Interference image 212 is characterized by relatively bright straight vertical interference bands 214 similar to interference bands 209 in interference image 206 (FIG. 8B) but does not comprise straight horizontal interference bands. Because of the scan variations, the bright horizontal interference bands 208 characteristic of interference image 206 are morphed in interference image 212 into zigzag bright interference bands 215.

Figure 8D:
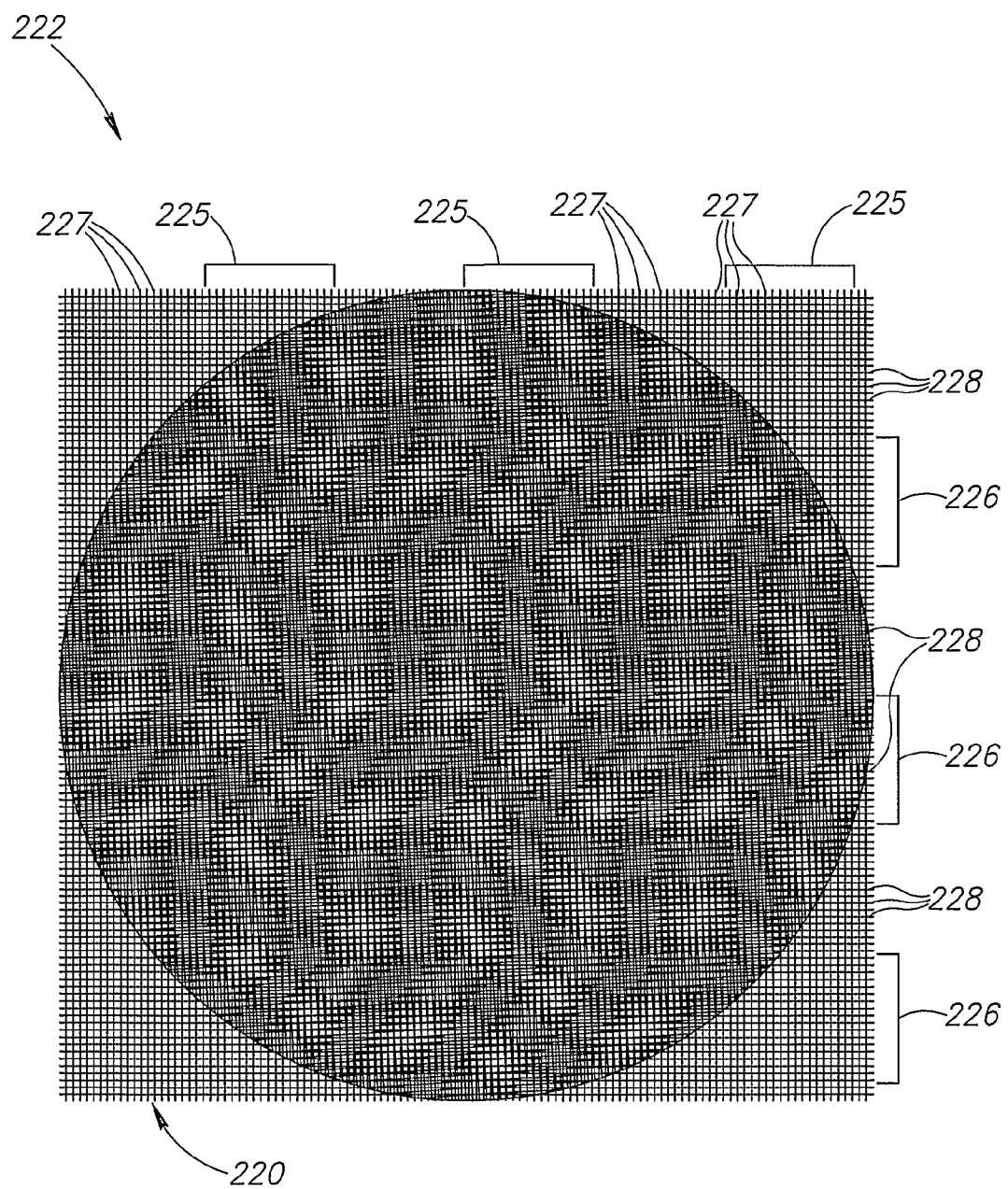

In FIG. 8D reference image 200 is superimposed with a copy 220 of the test image that suffers from spacing variations in both the scan and process directions to form an interference image 222. By way of example the banding and scan variations in copy 220 comprises vertical line-bands indicated by brackets 225 comprising vertical lines 227 and horizontal line bands 226 comprising horizontal lines 228 for which interline spacing is about 3% greater than interline spacing outside of the line bands. Interference image 222 exhibits zigzag bright interference bands along both the horizontal and vertical directions.

It is noted that for convenience of presentation, banding in copy images 100, 130, 210 (FIGS. 5-7) and 220 (FIGS. 8C and 8D) is characterized by line-bands having a same width, constant spatial period, same uniform interline spacing and a discontinuous change in interline spacing between lines in the line-bands and lines outside the line-bands. However, banding is of course not limited to such "regular" and "convenient" patterns and discontinuities. Banding may be characterized by interline spacing changes that are gradual or continuous and/or by line-bands having different widths and/or line-bands that are not periodic with constant period. Irregular and more "plastic" line-band patterns may be especially characteristic of scan direction defects caused by changes in the scan velocity with which for example laser beam 46 (FIGS. 1A and 1B) scans a line on PIC 26.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method of determining a quantity of variations in interline spacing in a first image comprising a first plurality of parallel lines of pixels comprising:
   providing a second image comprising a second plurality of parallel lines;
   orienting the images so that the lines in the first and second pluralities are superimposed and angled with respect to each other to generate a Moire interference pattern having interleaved relatively light and relatively dark interference bands each of which comprises relatively straight segments; and
   using the Moire interference pattern to determine the quantity of said variations, comprising:
      determining an angle between straight segments; and
      determining the quantity of said variations in the interline spacing as a function of the angle.

2. A method according to claim 1 wherein the variation is characterized by at least one group of lines having a plurality of consecutive lines for which interline spacing is different from interline spacing of lines outside the at least one group.

3. A method according to claim 2 wherein the interline spacing between lines in the at least one group is substantially the same for any pair of adjacent lines in the at least one group.

4. A method according to claim 3 wherein the interline spacing for lines outside the at least one group is substantially the same for any pair of adjacent lines outside the at least one group.

5. A method according to claim 2, wherein the at least one group comprises a plurality of groups.

6. A method according to claim 5 wherein the groups are periodic.

7. A method according to claim 6 and comprising using the interference pattern to determine a period for the groups of lines.

8. A method according to claim 2 and comprising using the interference pattern to determine an amount by which interline spacing of lines in the group differs from interline spacing between lines outside of the at least one group.

9. A method according to claim 1 wherein the Moire pattern comprises a pattern of interleaved relatively light and relatively dark interference bands.

10. A method according to claim 9 wherein each interference band comprises relatively straight segments that are angled with respect to each other and using the interference pattern to determine a difference in interline spacing comprises determining an angle between the segments of an interference band.

11. A method according to claim 10 wherein using the angle between the segments comprises determining a ratio R of the interline spacing between lines in the at least one group of lines relative to lines outside of the at least one group in accordance with an expression of the form $R=\cos(\theta+\alpha/2)/\cos(\theta-\alpha/2)$, where $\theta$ is the determined angle between segments and $\alpha$ is the angle between lines in the first and second images.

12. A method according to claim 1 wherein the light and dark interference bands cross the lines in the first and second images, wherein a location in the Moire pattern is defined relative to an x-axis and a y-axis respectively parallel and perpendicular to the lines in the first image and each interference band defines a contour line that lies along a central spine of the interference band and a direction line that lies along a general direction of the contour line, and comprising estimating the interline spacing of lines in the first image at a given y-coordinate in accordance with a formula, $(s^2 L)(d\Delta x/dy)$, where s is an interline spacing in the second image, L is a distance between adjacent bright or adjacent dark interference bands at the given y-coordinate and $\Delta x$ is a distance between the contour line and direction line at the given y-coordinate.

13. A method according to claim 1 wherein the first image comprises a third plurality of parallel lines that cross lines in the first plurality of parallel lines.

14. A method according to claim 13 wherein the lines in the second image comprise a fourth plurality of lines that cross the second plurality of lines.

15. A method according to claim 14 wherein orienting the images comprises orienting so that an angle between the lines in the first and second pluralities is substantially smaller than an angle between the lines in the first and fourth pluralities.

16. A method according to claim 13 wherein the lines in the first and third pluralities of parallel lines are substantially perpendicular.

17. A method according to claim 16 wherein the lines in the second and fourth pluralities are substantially perpendicular.

* * * * *

UNITED STATES PATENT AND TRADEMARK OFFICE
CERTIFICATE OF CORRECTION

| | |
|---|---|
| PATENT NO. | : 8,085,441 B2 |
| APPLICATION NO. | : 11/631572 |
| DATED | : December 27, 2011 |
| INVENTOR(S) | : Michael Plotkin et al. |

It is certified that error appears in the above-identified patent and that said Letters Patent is hereby corrected as shown below:

In column 13, line 18, in Claim 12, delete "Ax" and insert -- $\Delta x$ --, therefor.

Signed and Sealed this
Sixteenth Day of October, 2012

David J. Kappos
*Director of the United States Patent and Trademark Office*